C. B. COTTRELL.

Printing Press.

No. 9,701. Reissued May 10, 1881.

Witnesses

Fred. Haynes

A. C. Webb

Inventor

C. B. Cottrell by his Attorneys

Brown & Brown

N. PETERS, Photo-Lithographer, Washington, D. C.

UNITED STATES PATENT OFFICE.

CALVERT B. COTTRELL, OF WESTERLY, RHODE ISLAND.

PRINTING-PRESS.

SPECIFICATION forming part of Reissued Letters Patent No. 9,701, dated May 10, 1881.

Original No. 212,196, dated February 11, 1879. Application for reissue filed January 10, 1881.

DIVISION B.

*To all whom it may concern:*

Be it known that I, CALVERT B. COTTRELL, of Westerly, in the county of Washington and State of Rhode Island, have invented a certain new and useful Improvement in Printing-Presses; and I do hereby declare that the following is a full, clear, and exact description of the same, reference being had to the accompanying drawings, forming part of this specification.

This improvement relates to the application, in printing-presses having reciprocating beds, of air-springs for the purpose of gradually arresting the movement of the bed, and especially of air-springs which have their two component members—viz., the cylinder and the plunger—both detached from the reciprocating bed when not in operation. In such presses the cylinders of the air-springs may be stationary and the plungers move within them, or the plungers may be stationary and the cylinders move upon them. One of the obstacles to the successful working of these springs is that the friction between the cylinder and plunger is sometimes so great that the natural expansion of the compressed air in the cylinder, which occurs when the bed begins to return, is insufficient to produce the reaction of the spring—that is to say, the return of its plunger or cylinder; and this is more especially the case when there is any leakage of air from the cylinder.

The object of this improvement is to overcome this obstacle; and to this end the improvement consists in the combination, with an air-spring for arresting the movement of the bed of a printing-press, of a supplementary spring, which produces, or assists to produce, the reaction of the said air-spring after its action upon and by the bed.

Figure 1:
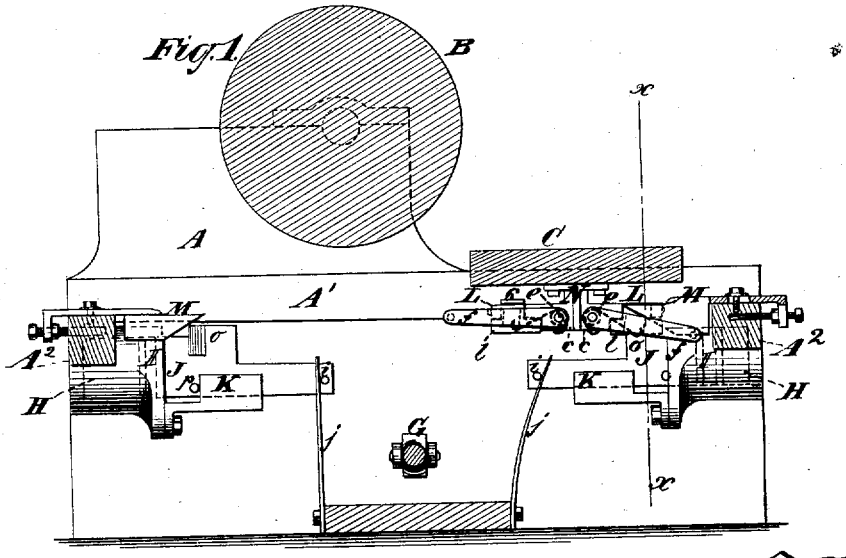
Figure 4:
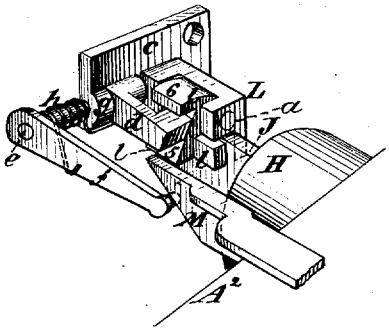
Figure 2:
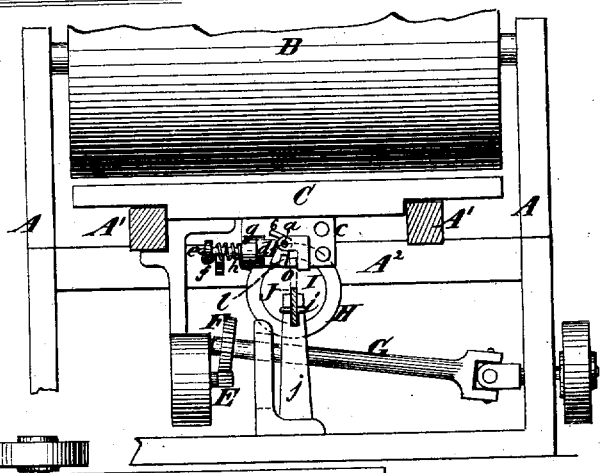
Figure 3:
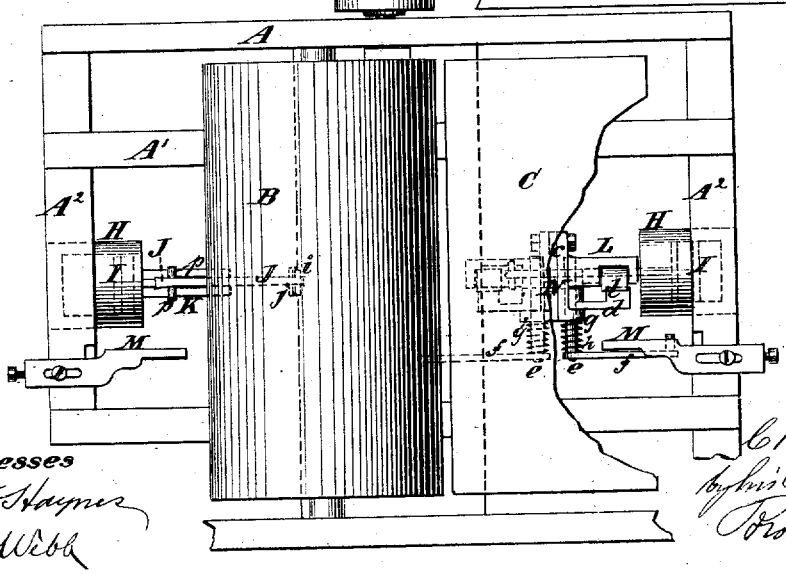

Figure 1 in the drawings is a longitudinal vertical section of a printing-press illustrating my invention, all the parts not necessary for such illustration being omitted. Fig. 2 is a transverse vertical section of the same, in the line *x x* of Fig. 1. Fig. 3 is a plan of the same with part of the bed broken away to show the devices for connecting the air-springs with the bed at the proper time for the operation of said springs. Fig. 4 is a perspective view of the devices for engaging and disengaging the plunger of the air-spring with and from the bed of the press.

A A′ $A^2$ indicate the stationary framing of the press. B is the impression-cylinder. C is the reciprocating bed, running on the tracks A′ A′, and having attached to it the rack E, through which it receives its reciprocating motion from the pinion F on the vibrating shaft G. All of the above parts are or may be of well-known construction.

H H are the cylinders of the air-springs, of which there is shown one for each end of the press. Each of these cylinders is bolted securely to one of the fixed cross-pieces $A^2$ $A^2$ at the ends of the framing. The said cylinders are closed at their outer ends, but open at their inner ends. I I are the plungers of the air-springs, fitted to the said cylinders, and furnished with rods, J J, which project some distance from the open inner ends of the cylinders H H, and which work in fixed guides K K, secured firmly to the said cylinders.

The means of engaging the air-springs with the bed, which I have shown in the drawings to illustrate this improvement, are as follows:

N is a rigid hanger rigidly secured to the under side of the bed C. To opposite sides of this hanger there are rigidly secured two clamps, L *l* L *l*, for taking hold of the rods J J of the air-spring plungers, and thereby connecting either of the said plungers, as required, with the said bed as the latter arrives within a suitable distance from the end of its stroke in either direction. These clamps, of which one with its operating mechanism is shown in the perspective view, Fig. 4, consist each of a fixed jaw, L, bolted securely and rigidly through its flange C to the hanger N, and a movable jaw, *l*, pivoted by a pin, *a*, to the fixed jaw L.

In the flange *c* of each fixed jaw L there is a bearing, *g*, for the fulcrum-pin *e* of a cranked lever, *d e f*, the shorter arm, *d*, of which works between the inclined outer face, 5, of the respective movable jaw and an ear, 6, on the upper part of the said jaw, and the longer arm, *f*, of which projects toward one of two fixed wedges or inclined cams, M M, which are firmly secured, one to each of the fixed end pieces, $A^2$ $A^2$, of the framing of the press.

On each fulcrum-pin *e* there is coiled a spring, *h*, which operates, between the flange *c* of the fixed jaw L of the clamp and the arm *f* of the lever *d e f*, to press the said arm upward, and so press its respective arm *d* against the ear 6 of the movable jaw *l*, and thereby hold the said jaw open, as shown in Fig. 2, so that as the bed C approaches to within a suitable distance from either end of the press the open clamp L *l* will receive between its jaws the upper part of the plunger-rod J of the air-spring belonging to its respective end of the press. When the bed arrives in the proper position the arm *f* of the lever comes in contact with the lower inclined edge of the wedge or cam M, and by the continued movement of the lever with the bed the said arm is depressed by running under the said inclined edge, and the arm *d* is depressed against the inclined face 5 of the movable jaw *l* of the clamp, and so caused to press the said jaw against the plunger-rod J, which is thereby grasped between the said jaw and the jaw L, and caused to carry forward the plunger I into the air-cylinder H, and thereby produce the compression of the air in the said cylinder until the movement of the bed is arrested. When the bed returns the coiled spring *h* raises the arm *f* of the lever *d e f*, and thereby brings the arm *d* up against the ear 6 of the jaw *l*, and thereby liberates the plunger-rod, leaving the plunger free to be forced back by the pressure of the air in the cylinder H; but as the plunger might, owing to the leakage of air or to the sticking of the plunger, fail to be returned by the pressure of the air, I provide for each plunger-rod, for the purpose of drawing back or assisting to draw back the plunger, a supplementary spring, which is what constitutes the principal feature of this improvement. Such auxiliary springs are represented in Figs. 1 and 2, for convenience of illustration, as composed of steel bars or flat rods *j j*, secured at their lower ends to the stationary framing of the press, and having their upper ends pressing against projections *i i* on their respective plunger-rods J J. The backward movement of the plungers is arrested by stops *p p*, provided on their rods, coming in contact with the guides K K, as shown at the left-hand end of Fig. 1.

I will remark, in conclusion, that though the particular devices herein described are well adapted for the purpose of engaging the air-springs with the bed, other and perhaps simpler devices might be employed.

I do not claim as part of this improvement the devices herein described for engaging the air-springs with the bed of the press, as they constitute the subject-matter of the claims in another division of this reissue, but

What I claim as my invention is—

1. The combination, in a printing-press having a reciprocating bed, of an air-spring for arresting the movement of the bed, and a supplementary spring for producing or assisting to produce the reaction of said air-spring, substantially as herein described.

2. The combination, with the reciprocating bed of a printing-press, of an air-spring, the two component members of which, consisting of a cylinder and a plunger, are both detached from the bed when the spring is not in operation, and a supplementary spring for drawing back or assisting to draw back the movable member of such air-spring after its operation of arresting the bed, substantially as herein described.

3. The combination, with the reciprocating bed of a printing-press, of the air-spring H I and the supplementary spring *j*, substantially as and for the purpose herein set forth.

C. B. COTTRELL.

Witnesses:
FREDK. HAYNES,
A. C. WEBB.